United States Patent
Pilavdzic (10) Patent No.: US 7,618,566 B2
(45) Date of Patent: *Nov. 17, 2009

(54) CONTROLLER FOR AT LEAST ONE HEATER UTILIZED IN A HOT RUNNER INJECTION MOLDING SYSTEM AND AN ASSOCIATED METHOD OF USE

(75) Inventor: Jim Pilavdzic, Milton, VT (US)

(73) Assignee: Husky Injection Molding Systems Ltd. (CA)

( * ) Notice: Subject to any disclaimer, the term of this patent is extended or adjusted under 35 U.S.C. 154(b) by 683 days.

This patent is subject to a terminal disclaimer.

(21) Appl. No.: 11/384,876

(22) Filed: Mar. 20, 2006

(65) Prior Publication Data

US 2007/0216055 A1 Sep. 20, 2007

(51) Int. Cl.
*B29C 45/78* (2006.01)

(52) U.S. Cl. ............... 264/40.6; 264/328.14; 425/135; 425/143; 425/149; 164/155.6; 164/450.3

(58) Field of Classification Search ............... 264/40.3, 264/40.6, 328.14; 425/135, 143, 149; 164/155.6, 164/450.3
See application file for complete search history.

(56) References Cited

U.S. PATENT DOCUMENTS

| | | | | |
|---|---|---|---|---|
| 3,733,059 | A | * | 5/1973 | Pettit ........................ 366/79 |
| 3,881,091 | A | | 4/1975 | Day |
| 4,272,466 | A | * | 6/1981 | Harris ...................... 264/40.6 |
| 4,462,786 | A | * | 7/1984 | Perryman ................... 425/388 |
| 4,545,464 | A | | 10/1985 | Nomura |
| 4,726,751 | A | | 2/1988 | Shibata et al. |
| 4,788,485 | A | | 11/1988 | Kawagishi et al. |
| 4,816,985 | A | | 3/1989 | Tanahashi |
| 4,851,982 | A | | 7/1989 | Tanahashi |
| 4,879,639 | A | | 11/1989 | Tsukahara |
| 4,894,763 | A | | 1/1990 | Ngo |
| 5,136,494 | A | | 8/1992 | Akagi et al. |
| 5,177,677 | A | | 1/1993 | Nakata et al. |
| 5,272,644 | A | | 12/1993 | Katsumata et al. |
| 5,285,029 | A | | 2/1994 | Araki |
| 5,456,870 | A | * | 10/1995 | Bulgrin ...................... 264/40.6 |
| 5,465,202 | A | | 11/1995 | Ibori et al. |
| 5,504,667 | A | | 4/1996 | Tanaka et al. |
| 5,582,756 | A | | 12/1996 | Koyama |
| 5,663,627 | A | | 9/1997 | Ogawa |

(Continued)

OTHER PUBLICATIONS

"New PID2-Hot Runner Controller For Up To 24 Zones Of Control", Husky Injection Molding Systems, Dec. 7, 2004.

(Continued)

*Primary Examiner*—Joseph S. Del Sole
*Assistant Examiner*—Timothy Kennedy (57) ABSTRACT

A controller for at least one heater utilized in a hot runner injection molding system, which includes a regulated voltage supply that is electrically connected to the at least one heater utilized in a hot runner injection molding system, at least one sensor operatively associated with at least one heater and utilized in a hot runner injection molding system, at least one digital signal processor that is operatively connected to the at least one heater utilized in a hot runner injection molding system, the regulated voltage supply and the sensor operatively associated with the at least one heater utilized in a hot runner injection molding system based on feedback from the at least one sensor.

14 Claims, 3 Drawing Sheets

U.S. PATENT DOCUMENTS

| | | |
|---|---|---|
| 5,694,307 A | 12/1997 | Murugan |
| 5,762,839 A | 6/1998 | Kamiguchi et al. |
| 6,009,003 A | 12/1999 | Yeo |
| 6,090,318 A | 7/2000 | Bader et al. |
| 6,559,631 B1 | 5/2003 | Balch et al. |
| 6,603,672 B1 | 8/2003 | Deng et al. |
| 7,020,540 B2 | 3/2006 | Linehan et al. |
| 2002/0031567 A1* | 3/2002 | Magario ............... 425/135 |
| 2005/0184689 A1 | 8/2005 | Maslov et al. |

OTHER PUBLICATIONS

TTC Family, Global Hot Runner Control Solutions, Gammaflux Product Brochure, Feb. 14, 2003.

LEC Temperature Controller, Gammaflux Product Brochure, Oct. 20, 2004.

* cited by examiner

CONTROLLER FOR AT LEAST ONE HEATER UTILIZED IN A HOT RUNNER INJECTION MOLDING SYSTEM AND AN ASSOCIATED METHOD OF USE

TECHNICAL FIELD OF THE INVENTION

The present invention relates to control of at least one heater utilized in a hot runner injection molding system, and particularly an improved controller utilizing a digital signal processor with feedback for fast and accurate control of at least one heater utilized in a hot runner injection molding system.

BACKGROUND OF THE INVENTION

In a typical injection molding system, molten resin is loaded into a tubular passage called a runner. The molten resin flows from the runner through a gate valve and into the cavity of the mold. The resin in the mold is then cooled and hardens into an article. The mold is opened and the article is ejected.

In a cool runner injection molding system, resin inside the runner and the cavity of the mold is cooled and ejected. In contrast, in a hot runner injection system, resin in the hot runner is kept molten and injected into the cavity during the next molding cycle. In order to keep the resin in the runner molten, the runner is heated. In addition, the resin at the gate valve is cooled to prevent molten resin from dripping out when the mold is opened. This process requires precise and fast temperature control to effectuate changes. In addition, in the hot runner injection molding system, a heater can be utilized with a number of components, including, but not limited to a barrel, a distributor, and a nozzle.

There are a number of different ways to heat the runner. These include: electric resistance heating; induction heating; and a combination of both types of heating. Induction heating consists of winding insulated, conductive wires around the area surrounding the runner near the gate. When the windings are supplied with high frequency power, the area around the runner is heated by electromagnetic induction.

U.S. Pat. No. 4,726,751 to Shibata et al. discloses a temperature control system for a hot runner plastic injection molding system where the voltage frequency is varied that is applied to the heater windings. However, Shibata et al. only adjusts the power to the heaters in discrete, automatic steps with parallel resistors and/or capacitors rather than utilizing seamless frequency variations based on a sensed temperature. Furthermore, Shibata et al. is limited to only varying voltage frequency and not voltage amplitude. U.S. Pat. No. 4,726,751 to Shibata et al. is incorporated herein by reference in its entirety.

U.S. Pat. No. 4,788,485 to Kawagishi et al., U.S. Pat. No. 5,136,494 to Akagi et al., U.S. Pat. No. 5,177,677 to Nakata et al., U.S. Pat. No. 5,504,667 to Tanaka et al., and U.S. Pat. No. 5,663,627 to Ogawa disclose utilizing pulse width modulation to convert AC power to DC power and are directed solely to motor control and not heating systems. U.S. Pat. No. 4,851,982 to Tanahashi discloses a system that uses pulse width modulation, conversion of AC power to DC power and then back to AC power, and then varying the voltage and the frequency for use with elevator motors.

U.S. Pat. No. 5,285,029 to Araki, U.S. Pat. No. 4,545,464 to Nomura, U.S. Pat. No. 4,879,639 to Tsukahara, U.S. Pat. No. 4,894,763 to Ngo, U.S. Pat. No. 5,465,202 to Ibori et al., and U.S. Pat. No. 5,694,307 to Murugan disclose converting AC power to DC power and then back to AC power but does not involve the field of temperature control. U.S. Pat. No. 6,603,672 to Deng discloses conversion of DC current to AC current which is then converted from AC current to DC current and then controlling the output frequency. However, Deng does not disclose applying these methods to temperature control in the field of heaters that can be used in hot runner injection molding systems. U.S. Pat. No. 6,009,003 to Yeo and U.S. Pat. No. 4,816,985 to Tanahashi disclose current/voltage control for an elevator system.

U.S. Pat. No. 3,881,091 to Day discloses a control for heating currents in a multiple cavity injection molding machine using a solid state, bidirectional conducting device for controlling current load, a phase shifting capacitor connected to the conducting device, a variable resistor connected in parallel to the conducting device and a switch to short out the variable resistor to maximize the flow of current. However, Day does not disclose utilizing a digital signal processor for controlling voltage frequency or amplitude. U.S. Pat. No. 3,881,091 to Day is incorporated herein by reference in its entirety.

U.S. Patent Application No. 2005/0184689 to Maslov et al. discloses a microprocessor controller that alters the power supply based on current feedback. U.S. Pat. No. 6,090,318 to Bader et al. discloses taking a mean of measured temperatures in individual hot runners and raising and lowering the measured melt temperatures together. This Reference also appears to teach away from the present invention by stating: "To prevent continuous fluctuation in the hot-runner temperatures, however, the new temperature set points for the various cavities are first compared with the measured actual temperatures and the old set points, and only after this comparison in stage 33 of the computer is it decided whether a command should be given to the hot-runner controller 17 to alter the set point for a cavity." (Column 5, Lines 38-45). Therefore, there is not a fast and efficient control of the heater but an analysis of a number of set points and then an alteration of the current set point.

Figure 1:
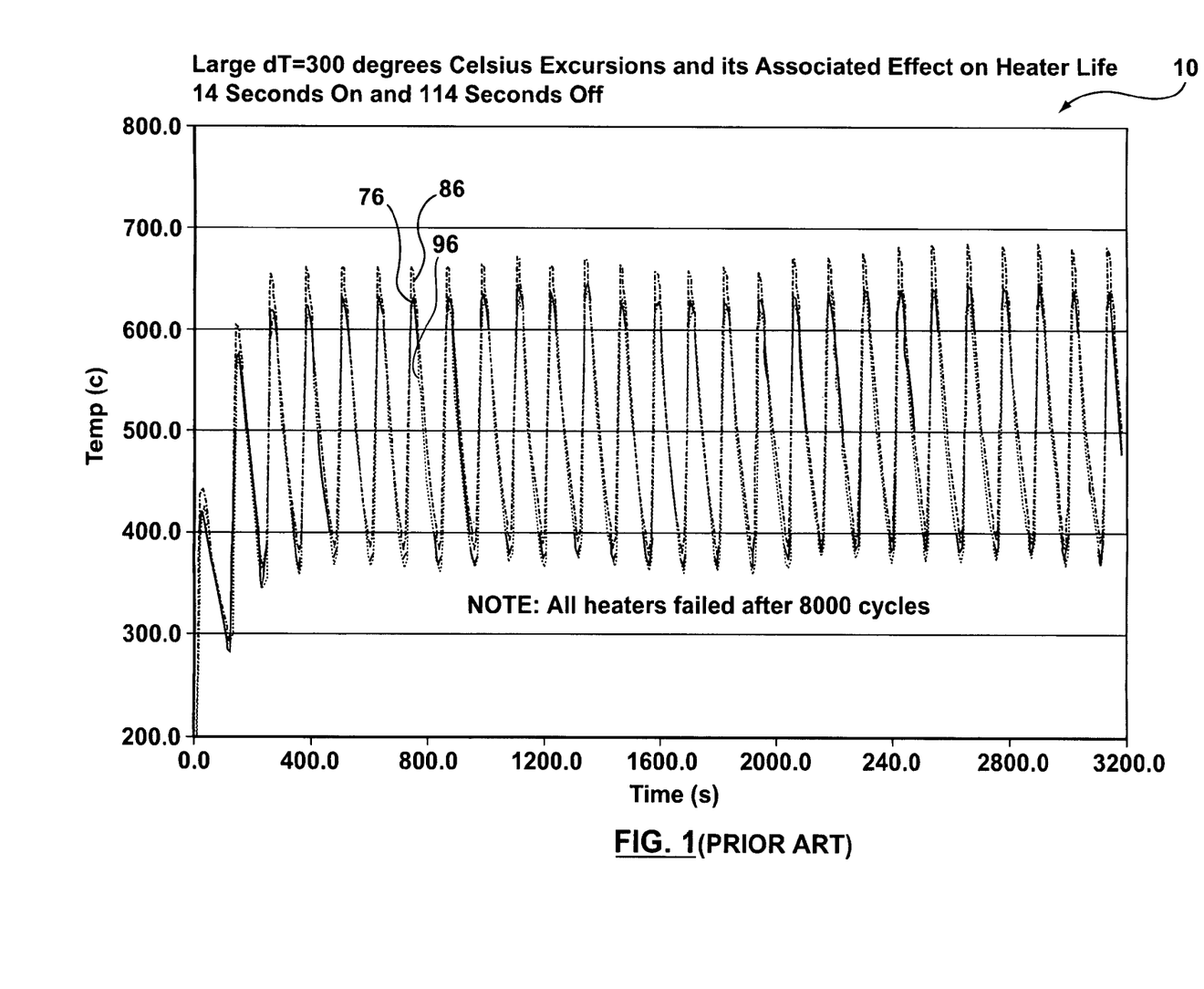
FIG. 1 illustrates a graphical representation of a large temperature excursion and associated effect on the life of a heater such as that utilized in an injection molding system as found in the prior art.

Existing temperature controllers are not capable of fast and precise control of temperature. This lack of control allows temperature swings in the heater windings which causes heater failure creating a major problem. As shown in FIG. 1, a large temperature excursion is shown in the graph indicated by numeral 10. The temperature excursion ("dT") is 300° Celsius with duty cycle of 14 seconds on and 114 seconds off. The results for a first temperature sensor are indicated by numeral 76, the results for a second temperature sensor are indicated by numeral 86 and the results for a third temperature sensor are indicated by numeral 96. The heaters, measured by all three (3) temperature sensors 76, 86 and 96, failed prior to 8,000 cycles. In addition, existing control systems utilize either zero switching or phase firing for control of the voltage supplied to the windings of the heaters. Phase firing introduces the problem of electrical noise into the system which also makes it difficult to have a fast and precise control of temperature.

The present invention is directed to overcoming one or more of the problems set forth above.

SUMMARY OF INVENTION

In one aspect of this invention, a digital signal processor (DSP) that can utilize software algorithms, feedback signals, and output signals to provide temperature control is disclosed. The DSP has the ability to digitally control temperature with both accuracy and speed.

In another aspect of this invention, a digital signal processor that can utilize both zero switching and phase firing control methods for control of voltage for heating is disclosed.

These control methods reduce heater temperature oscillations around a set point in order to extend the life of a heater as well as reduce noise generation. Maximum voltage and frequency will be applied to the windings of a heater for maximum heat generation without affecting the reliability of the heaters. The digital signal processor will use temperature feedback, set point control and monitoring, and open loop percentage control that will give a significant advantage in processing polymers with a hot runner injection molding system where direct temperature control at the hot nozzle tip is not always possible.

In still another aspect of this invention, a controller for at least one heater utilized in a hot runner injection molding system is disclosed. The controller includes a regulated voltage supply that is electrically connected to the at least one heater utilized in a hot runner injection molding system, at least one temperature sensor located distal proximate to the at least one heater utilized in a hot runner injection molding system, and at least one digital signal processor that is operatively connected to the at least one heater utilized in a hot runner injection molding system, the regulated voltage supply and the at least one temperature sensor for regulating temperature of the at least one heater utilized in a hot runner injection molding system based on feedback from the at least one temperature sensor, a voltage sensor, a current sensor or combination of sensors to achieve better heater control.

In yet another aspect of the invention, a controller for at least one heater utilized in a hot runner injection molding system is disclosed. The controller includes a regulated voltage supply that is electrically connected to the at least one heater utilized in a hot runner injection molding system, at least one first sensor from the group consisting of a temperature sensor located distal proximate to the at least one heater utilized in a hot runner injection molding system, a current sensor utilized in a hot runner injection molding system and a voltage sensor utilized in a hot runner injection molding system, at least one second sensor from the group consisting of a material state change sensor, a pressure sensor, a resistance shift sensor, a capacitance sensor, an inductance sensor, a material phase change sensor, a permeability sensor, a density sensor, a viscosity sensor, a shear feedback sensor, a material flow sensor, a polymerization response sensor, a strain sensor, a stress sensor and a transformation function sensor, and at least one digital signal processor that is operatively connected to the at least one heater utilized in a hot runner injection molding system, the regulated voltage supply, the at least one first sensor utilized in a hot runner injection molding system and the at least one second sensor utilized in a hot runner injection molding system.

In still yet another aspect of the invention, a controller for at least one heater utilized in a hot runner injection molding system is disclosed. The controller includes a regulated voltage supply that is electrically connected to the at least one heater utilized in a hot runner injection molding system, at least one first sensor from the group consisting of a temperature sensor located distal proximate to the at least one heater utilized in a hot runner injection molding system, a current sensor utilized in a hot runner injection molding system and a voltage sensor utilized in a hot runner injection molding system, at least one second sensor from the group consisting of a material state change sensor, a pressure sensor, a resistance shift sensor, a capacitance sensor, an inductance sensor, a material phase change sensor, a permeability sensor, a density sensor, a viscosity sensor, a shear feedback sensor, a material flow sensor, a polymerization response sensor, a strain sensor, a stress sensor and a transformation function sensor, at least one digital signal processor that is operatively connected to the at least one heater utilized in a hot runner injection molding system, the regulated voltage supply, the at least one first sensor utilized in a hot runner injection molding system and the at least one second sensor utilized in a hot runner injection molding system, at least one output switching module electrically connected to the at least one heater utilized in a hot runner injection molding system and the regulated voltage supply, wherein the at least one output switching module varies at least one of voltage and frequency to the at least one heater utilized in a hot runner injection molding system through at least one of pulse width modulation and zero crossing detection, at least one trigger control module that transmits command signals to the output switching module and the at least one trigger control module is electrically connected to the at least one digital signal processor and the regulated voltage supply, and at least one controller interface that is electrically connected to the at least one digital signal processor.

In an aspect of the invention, a method for controlling temperature of at least one heater utilized in a hot runner injection molding system is disclosed. The method includes receiving an input voltage with a regulated voltage supply that is electrically connected to the at least one heater utilized in a hot runner injection molding system, obtaining at least one temperature value from at least one temperature sensor located distal proximate to the at least one heater utilized in a hot runner injection molding system, and regulating temperature of the at least one heater utilized in a hot runner injection molding system with at least one digital signal processor that is operatively connected to the at least one heater utilized in a hot runner injection molding system, the regulated voltage supply and the at least one temperature sensor.

In yet another aspect of the invention, a method for controlling temperature of at least one heater utilized in a hot runner injection molding system is disclosed. The method includes receiving an input voltage with a regulated voltage supply that is electrically connected to the at least one heater utilized in a hot runner injection molding system, obtaining at least one first input value from a first sensor selected from the group consisting of a temperature sensor located distal proximate to the at least one heater utilized in a hot runner injection molding system, a current sensor utilized in a hot runner injection molding system and a voltage sensor utilized in a hot runner injection molding system, obtaining at least one second input value from a second sensor selected from the group consisting of a material state change sensor, a pressure sensor, a resistance shift sensor, a capacitance sensor, an inductance sensor, a material phase change sensor, a permeability sensor, a density sensor, a viscosity sensor, a shear feedback sensor, a material flow sensor, a polymerization response sensor, a strain sensor, a stress sensor and a transformation function sensor, and regulating a hot runner injection molding system with at least one digital signal processor that is operatively connected to the at least one heater utilized in a hot runner injection molding system, the regulated voltage supply, the at least one first sensor and the at least one second sensor.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so that the present invention will not be obscured.

Figure 2:
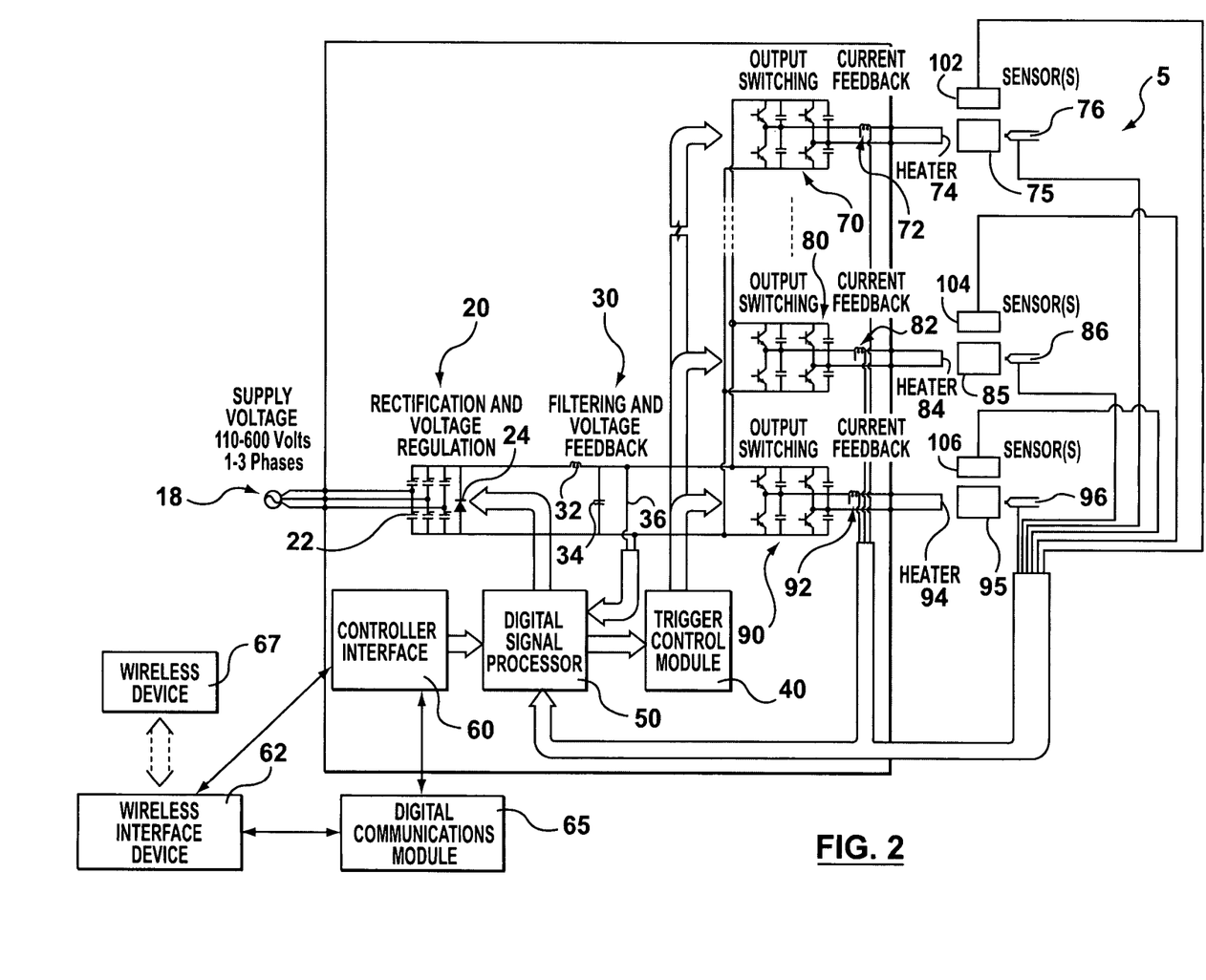
FIG. 2 illustrates a schematic view of the temperature controller according to the present invention.

FIG. 2 illustrates a schematic view of a temperature controller according to the present invention that is generally indicated by numeral 5. In the present invention, the temperature controller 5 utilizes a digital signal processor ("DSP") 50, which is preferably but not necessarily embedded. The digital signal processor ("DSP") 50 handles all of the software programs, feedback signals, and output signals that are utilized in the control of what is preferably, but not necessarily, an injection molding system. The present invention accepts a wide range of supply voltages 18, e.g., 110 Volts AC to about 600 Volts AC, at any frequency, e.g., 50 Hz to about 400 Hz and with one to three phases.

The supply voltage 18 is then converted to a DC voltage by a voltage rectifier and regulator module 20. The voltage rectifier and regulator module 20 is electrically connected to a voltage filtering and feedback stage 30 to ensure the quality of the DC voltage supply to the heaters 74, 84 and 94, respectively, utilized with hot runner injection molding equipment 75, 85 and 95, respectively.

Preferably, but not necessarily, the voltage rectifier and regulator module 20 includes a series of thyristors 22 and at least one diode 24. Also, triacs, transistors, and other comparable types of electrical components can be utilized for the voltage rectification and regulation in the regulator module 20. Preferably, but not necessarily, the voltage rectifier and regulator module 20 can provide phase angle control, time proportioning and true power control. True power control can compensate for physical property changes in the heaters 74, 84 and 94 and/or voltage changes.

The voltage filtering and feedback stage 30 preferably, but not necessarily includes at least one inductor 32 and at least one capacitor 34. The rectified, regulated, and filtered voltage is then provided to the heaters 74, 84 and 94, respectively, utilized preferably, but not necessarily with the injection molding equipment 75, 85 and 95, respectively in one aspect of this invention where DC voltage is used for accurate set point maintenance. Understandably, the voltage filtering and feedback stage 30 will generate pulses of variable time base and variable amplitude proportionate with sensory feedback and communicate this to an output device, which in this illustrative, but nonlimiting, example is a heater. The rectified, regulated, and filtered voltage is also measured 36 with this measured voltage being fed back to the digital signal processor 50.

Moreover, the present invention is also optionally capable of generating control signals for controlling various injection molding systems and components 75, 85 and 95, e.g., hot runner injection molding system components, including water, mold base heating/cooling, cavity pressure and hydraulically operated material flow modulators in addition to mold temperature.

The digital signal processor 50 employs software control algorithms to generate control signals. Modifications, updates and new control features can be done in software thereby reducing cost compared to controls utilizing programmable controllers and/or analog microprocessors. The digital signal processor 50 is capable of automatic tuning by calculating optimum PID ("Proportional-Integral-Derivative") and other parameters required by the control scheme, e.g., feed-forward, PID control algorithm, slope control, differential inputs and other known methods. The most common control methodology is in process control. Preferably, this is a continuous feedback loop that keeps the process flowing normally by taking corrective action whenever there is any deviation from the desired value ("set point") of the process variable (rate of flow, temperature, voltage, etc.). An "error" occurs when an operator manually changes the set point or when an event (valve opened, closed, etc.) or a disturbance changes the load, thus causing a change in the process variable. The PID ("Proportional-Integral-Derivative") controller receives signals from sensors and computes corrective action to the actuators from a computation based on the error (proportional), the sum of all previous errors (integral) and the rate of change of the error (derivative).

The automatic calculation of PID parameters is accomplished by switching the output on and off to induce oscillations in the measured value. From the amplitude and the period oscillation, the PID parameters are calculated. This auto tuning is performed whenever the thermal load changes.

The present invention preferably includes a controller interface 60 that interprets operator input and generates commands to the digital signal processor 50. The digital signal processor 50 is configured with the controller interface 60 to run the process. There could also be support for a portable processor, e.g., laptop, visualizations in addition to a standalone operation (not shown). The controller interface 60 can be set-up to provide user access levels with different associated rights for each particular category of user.

The controller interface 60 may also include a menu structure such that setup, operation, debugging, and data collection are grouped together in a logical manner. The controller interface 60 may contain clear visual cues to injection molding system conditions and actions. The input from a user is preferably minimized to run the controller interface 60 and respond to alarm conditions.

The present invention may include a digital communications module 65 that is capable of communicating with a wide variety of computer networks, e.g., WAN, LAN, global computer network, e.g., the Internet, and so forth. A wide variety of output devices such as printers (not shown) can be electrically connected to the digital communications module 65.

This would allow for remote access and troubleshooting. The digital communications module 65 could also include a Serial Peripheral Interface ("SPI") port, which is a full-duplex synchronous serial interface for connecting low/medium bandwidth external devices using four wires. Serial Peripheral Interface ("SPI") port communicates using a master/slave relationship over two data lines and two control lines. The digital communications module 65 may also include an RS232 port, among other types of digital communication. In addition, the digital communications module 65 could be configured for local intra-module communication, e.g., Profibus, Ethernet, radio frequency ("RF") link over a power wire, and so forth.

In another embodiment of the invention, the digital communications module 65 is electrically connected to a wireless interface device 62. This wireless interface device 62 provides electronic communication with a wide variety of wireless devices 67 including, but not limited to, a hand-held unit; a radio frequency ("RF") controlled unit; a wireless local area network ("LAN") connected unit; a personal digital assistant ("PDA"), among other types of portable digital, wireless devices.

Another aspect of the present invention is that the temperature controller 5 is utilized to control the temperature of the heaters 74, 84 and 94, that are typically in the form of resistive heaters, inductive heaters, or heaters that are a combination of both resistive heaters and inductive heaters.

The digital signal processor 50 handles all of the software programs and closed loop controls for temperature in addition to generating command signals to the trigger control module 40 for control of the voltage rectifier and regulator module 20 and the output switching stages 70, 80, and 90.

The output switching stages 70, 80, and 90 are responsible for producing variable frequency to each heater 74, 84 and 94 with voltage (power) pulses modulated by switching devices, e.g., IGBTs, MOSFETs, that allow for DC current to be applied to each of the heaters 74, 84 and 94 when the software program determines heater set point stability and long life are needed. Preferably, but not necessarily, the output from each of the output switching stages 70, 80, and 90 is a voltage with a frequency of up to 400 Hz at about 240 Volts AC. Moreover, in the alternative, the output switching stages 70, 80, and 90 could be configured to provide a frequency in the range of from about 0 Hz to about 200,000 Hz.

The digital signal processor 50 employs a PID temperature control algorithm that is configured to control the temperature of the heater windings with a high degree of accuracy, e.g., +/−0.1° Celsius, in a wide temperature range, e.g., 0° Celsius through about 800° Celsius. This software platform is expandable to support multiple PID control loops for system voltage, current, and frequency. Voltage is controlled using zero crossing and phase control and preferably the PID control loop is applied to voltage amplitude control in a way that output from the heaters 74, 84 and 94 is proportional to device supplied voltage. In addition to control functions, the digital signal processor 50 is also configured to detect open circuits, reverse wires, pinched wires, and short circuit conditions in the feedback sensing circuits 36, 92, 96, as well as in power circuit 74, 84 and 94. Furthermore, the digital signal processor 50 may detect when one of the heaters 74, 84, and 94 may be wet and apply an appropriate voltage to dry the heaters 74, 84, and 94, i.e., a bake-out function, utilizing moisture detection and moisture mitigation algorithms. Furthermore, the digital signal processor 50 may detect incorrect wiring connections to any output devices 74, 84, 94.

In order for the digital signal processor 50 to implement control functions, the digital signal processor 50 is configured to accept various system measurements, e.g., injection molding system measurements. Preferentially, output signals are created by the digital signal processor 50 based on sensory input from sensors ("sensors") 102, 104 and 106. Sensors 102, 104 and 106 may include, but are not limited to: a material state change sensor; a pressure sensor; a resistance shift sensor; a capacitance sensor; an inductance sensor; a material phase change sensor; a permeability sensor; a density sensor; a viscosity sensor; a shear feedback sensor; a material flow sensor; a polymerization response sensor; a strain sensor; a stress sensor; and a transformation function sensor.

An illustrative, but nonlimiting, example of a sensor for monitoring a material state change sensor includes, but is not limited to, a fiber optic raman spectrometry (FORS) sensor that provides real time material state information. An illustrative, but nonlimiting, example of a sensor for monitoring pressure includes, but is not limited to, a transducer. An illustrative, but nonlimiting, example of a sensor for monitoring resistance shift includes, but is not limited to, a quartz crystal. An illustrative, but nonlimiting, example of a sensor for monitoring capacitance of a circuit includes, but is not limited to, a capacitance-to-digital conversion integrated circuit. An illustrative, but nonlimiting, example of a sensor for monitoring inductance of a circuit includes, but is not limited to, an inductance-to-digital conversion integrated circuit.

An illustrative, but nonlimiting, example of a sensor for monitoring material phase change includes, but is not limited to, a sensor that utilizes a hydrogel. An illustrative, but nonlimiting, example of a sensor for monitoring permeability includes, but is not limited to, a permeability sensor. An illustrative, but nonlimiting, example of a sensor for monitoring viscosity includes, but is not limited to, a viscosity sensor utilizing a cylinder and piston. An illustrative, but nonlimiting example of a sensor for monitoring shear feedback includes, but is not limited to, an integrated tactile/shear feedback array.

An illustrative, but nonlimiting, example of a sensor for monitoring material flow includes, but is not limited to, a sensor responsive to a material flow rate. An illustrative, but nonlimiting, example of a sensor for monitoring polymerization response includes, but is not limited to, a polymerization response sensor. An illustrative, but nonlimiting, example of a sensor for monitoring strain and/or stress includes, but is not limited to, a piezo-electric sensor element. An illustrative, but nonlimiting, example of a sensor for monitoring a transformation function includes, but is not limited to, a sensor whose output is modified via a transformation function.

A universal input with an advanced analog to digital converter can be utilized to sample the inputs during predetermined time intervals, e.g., 10 milliseconds or better at 120 Hz, and continuously to correct for drift. High noise immunity is achieved by rejection of pickup, e.g., 50/60 Hz, and other sources of noise. The resistance (impedance) of the heaters 74, 84 and 94 is measured to determine when one of the heaters 74, 84 and 94 might fail in order to perform scheduled maintenance. The temperature of the heaters 74, 84 and 94 is measured with sensors 76, 86, and 96 and these measured values are then provided to the digital signal processor 50. Illustrative, but nonlimiting, examples of temperature sensors include, but are not limited to, a thermocouple, a resistance temperature detector ("RTD"), and a pyrometer.

Moreover, the current to the heaters 74, 84 and 94 is also measured with sensors 72, 82 and 92 and these measured values are also provided to the digital signal processor 50. The current is controlled with set point control and then open loop percentage control to control temperature around the set point. Leakage current is measured to identify a wet heater condition for at least one of the heaters 74, 84 and 94 to determine when to activate the bake-out function and apply suitably modulated output.

Figure 3:
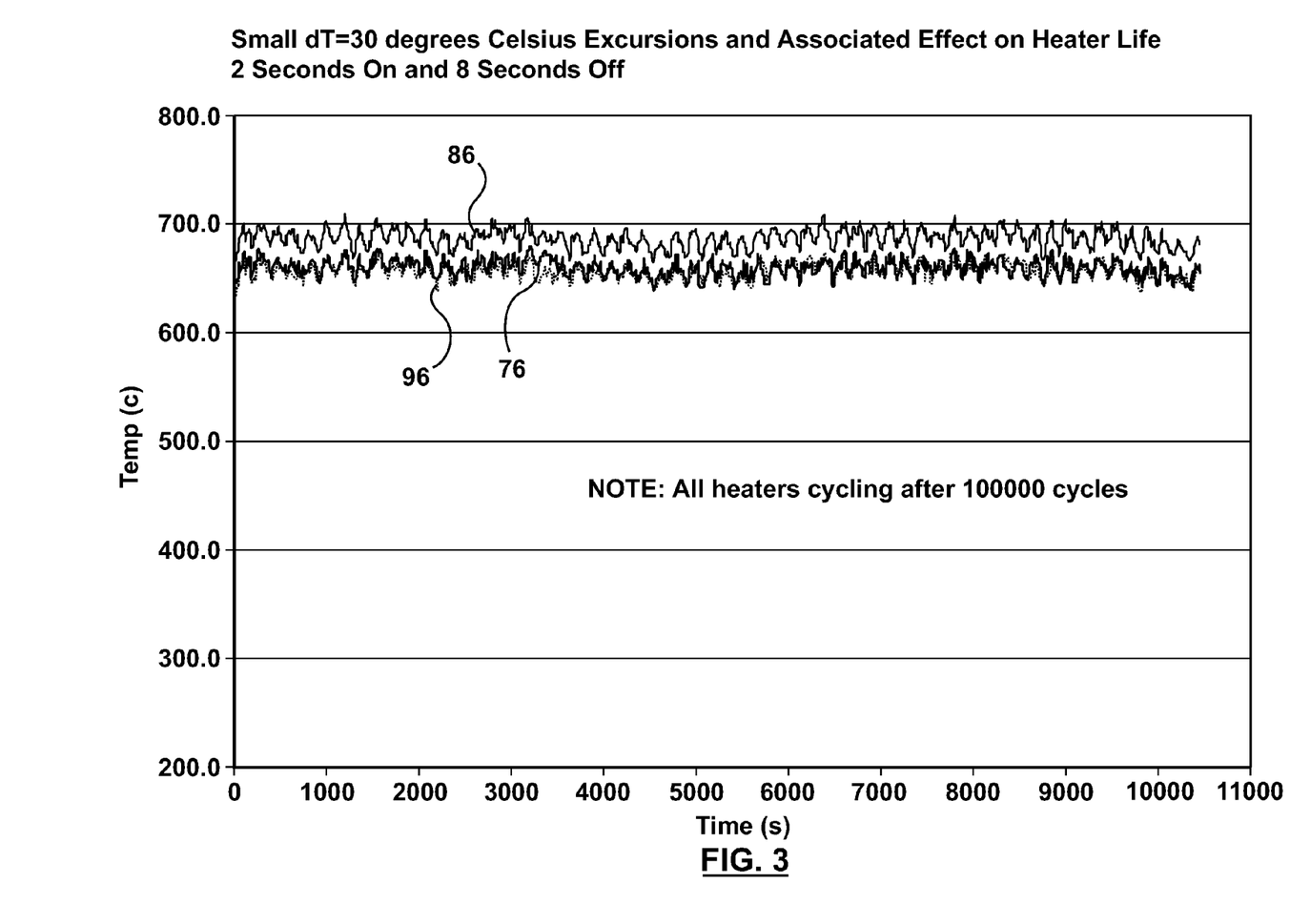
FIG. 3 illustrates a graphical representation of a small temperature excursion and associated effect on the life of a heater such as that utilized in an injection molding system according to the present invention.

The result of utilizing the present invention with a small temperature excursion ("dT") of 30° Celsius, with 2 seconds on and 8 seconds off so that all heaters 74, 84 and 94 can cycle past 10,000 cycles as shown in FIG. 3. The results for a first temperature sensor are indicated by numeral 76, the results for a second temperature sensor are indicated by numeral 86 and the results for a third temperature sensor are indicated by numeral 96. As shown, this will provide a tremendous increase in reliability.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "have," "having," "includes" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A method for controlling temperature of at least one heater utilized in a hot runner injection molding system, the method comprising:
   receiving an input voltage with a regulated voltage supply that is electrically connected to the at least one heater utilized in the hot runner injection molding system;
   obtaining at least one temperature value from at least one temperature sensor being positioned relative to the at least one heater utilized in the hot runner injection molding system; and
   regulating temperature of the at least one heater utilized in the hot runner injection molding system with at least one digital signal processor that is operatively connected to the at least one heater utilized in the hot runner injection molding system, the at least one digital signal processor being configured to connect with the at least one temperature sensor, and being configured to connect with the regulated voltage supply,
   wherein regulating temperature of the at least one heater is based on feedback being received from the at least one temperature sensor,
   increasing reliability of the at least one heater with the at least one digital signal processor by:
      (i) increasing a duty cycle associated with the at least one heater, the duty cycle being a ratio of active time that the at least one heater is on to a total time that the at least one heater is on and off, and
      (ii) reducing a temperature excursion associated with the duty cycle of the at least one heater.

2. The method for controlling temperature of the at least one heater utilized in the hot runner injection molding system according to claim 1, further comprising varying at least one of voltage and frequency to the at least one heater utilized in the hot runner injection molding system through at least one of pulse width modulation and zero crossing detection with at least one output switching module that is electrically connected to the at least one heater utilized in the hot runner injection molding system and the regulated voltage supply.

3. The method for controlling temperature of the at least one heater utilized in the hot runner injection molding system according to claim 1, further comprising transmitting command signals to an output switching module, wherein at least one trigger control module is electrically connected to the at least one digital signal processor and the regulated voltage supply.

4. The method for controlling temperature of the at least one heater utilized in the hot runner injection molding system according to claim 1, further comprising providing user input and receiving output with at least one controller interface that is electrically connected to the at least one digital signal processor.

5. The method for controlling temperature of the at least one heater utilized in the hot runner injection molding system according to claim 1, further comprising receiving input from at least one of a current sensor and a voltage sensor that is electrically connected to the at least one digital signal processor.

6. The method for controlling temperature of the at least one heater utilized in the hot runner injection molding system according to claim 1, further comprising utilizing zero crossing time proportioning control and phase fired voltage control with the at least one digital signal processor.

7. The method for controlling temperature of the at least one heater utilized in the hot runner injection molding system according to claim 1, further comprising utilizing at least one of a digital communications module and a wireless interface.

8. The method for controlling temperature of the at least one heater utilized in the hot runner injection molding system according to claim 7, wherein the digital communications module is operatively connected to a global computer network.

9. The method for controlling temperature of the at least one heater utilized in the hot runner injection molding system according to claim 7, wherein the wireless interface can communicate with a wireless device selected from the group consisting of a hand-held unit, a radio frequency controlled unit, a personal digital assistant, a portable processor or a radio frequency link over power wire communication.

10. A method for controlling temperature of at least one heater utilized in a hot runner injection molding system, the method comprising:
    receiving an input voltage with a regulated voltage supply that is electrically connected to the at least one heater utilized in the hot runner injection molding system;
    obtaining at least one first input value from a first sensor selected from the group consisting of a temperature sensor being positioned relative to the at least one heater utilized in the hot runner injection molding system, a current sensor utilized in the hot runner injection molding system and a voltage sensor utilized in the hot runner injection molding system;
    obtaining at least one second input value from a second sensor selected from the group consisting of a material state change sensor, a pressure sensor, a resistance shift sensor, a capacitance sensor, an inductance sensor, a material phase change sensor, a permeability sensor, a density sensor, a viscosity sensor, a shear feedback sensor, a material flow sensor, a polymerization response sensor, a strain sensor, a stress sensor and a transformation function sensor; and
    regulating the hot runner injection molding system with at least one digital signal processor that is operatively connected to the at least one heater utilized in the hot runner injection molding system, the regulated voltage supply, the first sensor and the second sensors,
    regulating temperature of the at least one heater with the at least one digital signal processor is based on feedback being received from the first sensor and the second sensor, increasing reliability of the at least one heater with wherein the at least one digital signal processor by:
  (i) increasing a duty cycle associated with the at east one heater, the duty cycle being a ratio of active time that the at least one heater is on to a total time that the at least one heater is on and off, and
  (ii) reducing a temperature excursion associated with the duty cycle of the at least one heater.

11. The method for controlling temperature of the at least one heater utilized in the hot runner injection molding system according to claim 10, further comprising varying at least one of voltage and frequency to the at least one heater utilized in the hot runner injection molding system through at least one of pulse width modulation and zero crossing detection with at least one output switching module that is electrically connected to the at least one heater utilized in the hot runner injection molding system and the regulated voltage supply.

12. The method for controlling temperature of the at least one heater utilized in the hot runner injection molding system according to claim 10, further comprising transmitting command signals to an output switching module, wherein at least one trigger control module is electrically connected to the at least one digital signal processor and the regulated voltage supply.

13. The method for controlling temperature of the at least one heater utilized in the hot runner injection molding system according to claim 10, further comprising providing user input and receiving output with at least one controller interface that is electrically connected to the at least one digital signal processor.

14. The method for controlling temperature of the at least one heater utilized in the hot runner injection molding system according to claim 10, further comprising utilizing at least one of a digital communications module and a wireless interface, wherein the wireless interface can communicate with a wireless device selected from the group consisting of a handheld unit, a radio frequency controlled unit, a personal digital assistant, a portable processor or a radio frequency link over power wire communication.

* * * * *